(12) United States Patent
Kim et al.

(10) Patent No.: US 12,227,858 B2
(45) Date of Patent: Feb. 18, 2025

(54) POLYBENZIMIDAZOLE-BASED ELECTROLYTE MEMBRANE FOR ALKALINE WATER ELECTROLYSIS AND WATER ELECTROLYSIS DEVICE COMPRISING THE SAME

(71) Applicant: KOREA INSTITUTE OF SCIENCE AND TECHNOLOGY, Seoul (KR)

(72) Inventors: Hyoung-Juhn Kim, Seoul (KR); Taekyung Lee, Seoul (KR); So Young Lee, Seoul (KR); Hee-Young Park, Seoul (KR); Bora Seo, Seoul (KR); Hyun Seo Park, Seoul (KR); Jong Hyun Jang, Seoul (KR); Tae Hoon Lim, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 374 days.

(21) Appl. No.: 17/589,466

(22) Filed: Jan. 31, 2022

(65) Prior Publication Data
US 2022/0243345 A1    Aug. 4, 2022

(30) Foreign Application Priority Data
Feb. 2, 2021    (KR) .................. 10-2021-0014726

(51) Int. Cl.
  *C25B 13/08*    (2006.01)
  *C25B 1/04*    (2021.01)
(52) U.S. Cl.
  CPC ............ *C25B 13/08* (2013.01); *C25B 1/04* (2013.01)
(58) Field of Classification Search
  None
  See application file for complete search history.

(56) References Cited

U.S. PATENT DOCUMENTS

| | | | | |
|---|---|---|---|---|
| 2006/0141315 A1* | 6/2006 | Murata | ................ | C08L 81/02 429/492 |
| 2015/0203976 A1* | 7/2015 | Noaki | ................ | C25B 11/031 204/256 |
| 2018/0073155 A1* | 3/2018 | Suzuki | ................ | C25B 11/057 |
| 2020/0259196 A1* | 8/2020 | Yamaki | ................ | H01B 1/124 |

FOREIGN PATENT DOCUMENTS

| | | |
|---|---|---|
| JP | 2008010430 A | 1/2008 |
| JP | 2018090687 A | 6/2018 |

OTHER PUBLICATIONS

Aili et al., Heterogeneous anion conducting membranes based on linear and crosslinked KOH doped polybenzimidazole for alkaline water electrolysis, Journal of Membrane Science, vol. 447, Nov. 2013, pp. 424-432 (Year: 2013).*

Ahn et al., Development of a membrane electrode assembly for alkaline water electrolysis by direct electrodeposition of nickel on carbon papers, Applied Catalysis B: Environmental, vols. 154-155, Jul.-Aug. 2014, pp. 197-205 (Year: 2014).*

Kraglund et al., Zero-Gap Alkaline Water Electrolysis Using Ion-Solvating Polymer Electrolyte Membranes at Reduced KOH Concentrations, Journal of the Electrochemical Society, vol. 163, No. 11, Jul. 2016, pp. F3125-F3131 (Year: 2016).*

L.A. Diaz et al., "Alkali-doped polyvinyl alcohol—Polybenzimidazole membranes for alkaline water electrolysis", Journal of Membrane Science 535, pp. 45-55, Apr. 2017.

* cited by examiner

*Primary Examiner* — Harry D Wilkins, III
(74) *Attorney, Agent, or Firm* — Rabin & Berdo, P.C.

(57) ABSTRACT

The present disclosure relates to a polybenzimidazole-based electrolyte membrane for alkaline water electrolysis, which includes a polybenzimidazole-based polymer, wherein the polybenzimidazole-based polymer is a biaxially oriented film. The polybenzimidazole-based electrolyte membrane for alkaline water electrolysis can reduce the concentration of an alkaline solution by improving the crystallinity of a polybenzimidazole-based polymer to increase the resistance against base, significantly improving the long-term stability of alkaline water electrolysis using a polybenzimidazole-based electrolyte membrane through the improved resistance against base, and by increasing the operation temperature to enhance the catalyst activity.

9 Claims, 3 Drawing Sheets

POLYBENZIMIDAZOLE-BASED ELECTROLYTE MEMBRANE FOR ALKALINE WATER ELECTROLYSIS AND WATER ELECTROLYSIS DEVICE COMPRISING THE SAME

CROSS-REFERENCE TO RELATED APPLICATION

This application claims priority to Korean Patent Application No. 10-2021-0014726 filed on Feb. 2, 2021 and all the benefits accruing therefrom under 35 U.S.C. § 119, the contents of which in its entirety are herein incorporated by reference.

BACKGROUND

1. Field

The present disclosure relates to an electrolyte membrane for alkaline water electrolysis and a water electrolysis device including the same. Particularly, the present disclosure relates to a polybenzimidazole-based electrolyte membrane for alkaline water electrolysis using simultaneous biaxial orientation and a water electrolysis device including the same.

2. Description of the Related Art

Renewable energy has been spotlighted due to fossil fuel depletion and climate change. Typical examples of such renewable energy include solar light and wind power generation. However, such energy sources are disadvantageous in that they are discontinuous and non-uniform, and thus there is a need for new measures. To reduce such problems of renewable energy, electrolysis technologies using electricity of renewable energy to produce hydrogen have been used recently. Hydrogen is a very useful raw material and can be used as fuel for various types of fuel cells.

Electrolysis is classified into three types of proton exchange membrane (PEM) water electrolysis, alkaline water electrolysis and solid oxide electrolysis cell (SOEC) water electrolysis, depending on the membrane used therefor. Proton exchange membrane (PEM) water electrolysis and alkaline water electrolysis are operated at 60-80° C., and solid oxide electrolysis cell (SOEC) water electrolysis is operated at 600-1,000° C. Among those, the proton exchange membrane (PEM) is known to be most suitable for a system for generating hydrogen through the connection with renewable energy by virtue of its advantages of fast start, load change cycle operation capability, high-purity hydrogen generation and operation in a high current density region. However, it is required that the proton exchange membrane (PEM) uses an expensive material, such as a platinum group metal (PGM) catalyst, a perfluorosulfonic acid (PFSA) polymer and a titanium diffusion medium.

Due to the above-mentioned problems, alkaline water electrolysis has been spotlighted recently. However, it is difficult to operate classical alkaline water electrolysis in a high current density region. In addition, since alkaline water electrolysis uses a liquid electrolyte (30% aqueous KOH solution) as an electrolyte and a porous membrane, it is vulnerable to rapid load change cycle operation or start/end operation.

To overcome the disadvantages of proton exchange membrane (PEM) water electrolysis and the conventional alkaline water electrolysis, anion exchange membrane (AEM) water electrolysis has been developed. Anion exchange membrane (AEM) water electrolysis uses a hard and densified electrolyte membrane, like proton exchange membrane (PEM) water electrolysis. Therefore, when using an anion exchange membrane (AEM), it is possible to solve most of the problems of the conventional alkaline water electrolysis. In addition, since anion exchange membrane (AEM) water electrolysis is operated under alkaline atmosphere, non-noble metal catalysts may be used instead of platinum group metal catalysts used for proton exchange membrane (PEM) water electrolysis. Recently, commercialized membranes available from Tokuyama and Fumatech have been used for anion exchange membrane (AEM) water electrolysis. In addition, a novel anion exchange membrane (AEM) material has been studied for the operation in a KOH solution or pure water. However, such polymers are limited in terms of long-term alkali stability, and thus realize their performance in the initial stage and are far from being commercialized.

More recently, polybenzimidazole (FBI) derivatives having higher stability against alkali as compared to the anion exchange membrane (AEM) have been used for alkaline water electrolysis. Since FBI is the most stable material having resistance against strong alkali, use of FBI for alkaline water electrolysis is a very reasonable way. Particularly, Kraglund et al. have developed alkaline water electrolysis technology with high quality (1700 mA cm$^{-2}$ at 1.8 V) recently by using FBI based on the novel concept of ion solvation. However, this technology does not show excellent long-term stability. It is thought that this is because FBI does not have such a level of stability that it can tolerate strong base.

REFERENCES

[Patent Document]
US Patent Laid-Open No. US 2020-0259196 A1

SUMMARY

The present disclosure is designed to solve the problems of the related art, and the present disclosure is directed to providing a polybenzimidazole-based electrolyte membrane for alkaline water electrolysis which can reduce the concentration of an alkaline solution by improving the crystallinity of a polybenzimidazole-based polymer to increase the resistance against base, significantly improving the long-term stability of alkaline water electrolysis using a polybenzimidazole-based electrolyte membrane through the improved resistance against base, and by increasing the operation temperature to enhance the catalyst activity, and a water electrolysis device including the same.

In one aspect, there is provided a polymer electrolyte membrane for alkaline water electrolysis which includes a polybenzimidazole-based polymer, wherein the polybenzimidazole-based polymer is a biaxially oriented film.

Preferably, the polybenzimidazole-based polymer may be represented by any one of the following Structural Formula 1 to Structural Formula 4:

[Structural Formula 1]

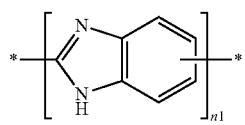

[Structural Formula 2]

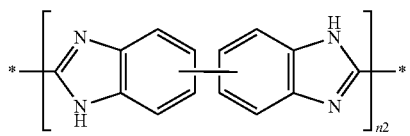

[Structural Formula 3]

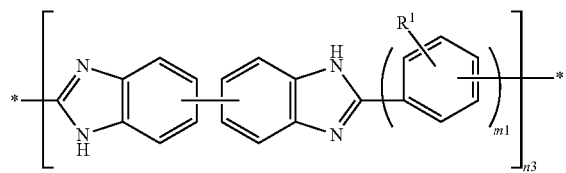

[Structural Formula 4]

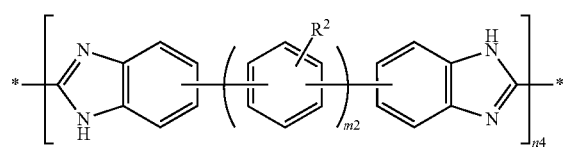

In Structural Formula 1 to Structural Formula 4, each of $R^1$ and $R^2$ independently represents H, —SO$_3$H, or a substituted or non-substituted C1-C30 alkyl group, each of m1 and m2 independently represents the number of a repeating unit which is an integer of 1-3, and each of n1 to n4 independently represents the number of a repeating unit, and each repeating unit has a number average molecular weight (Mn) of 5,000-50,000.

More preferably, the polybenzimidazole-based polymer may be represented by any one selected from the following Structural Formula 5 to Structural Formula 9:

[Structural Formula 5]

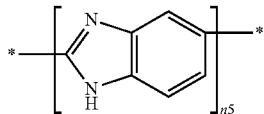

[Structural Formula 6]

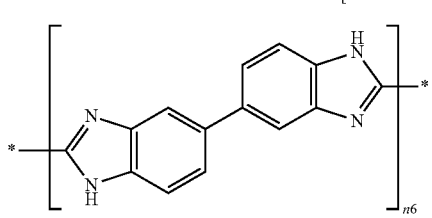

[Structural Formula 7]

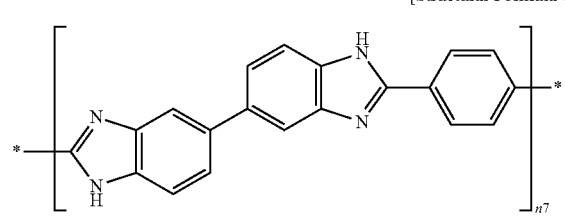

[Structural Formula 8]

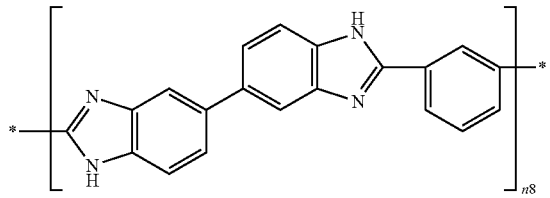

[Structural Formula 9]

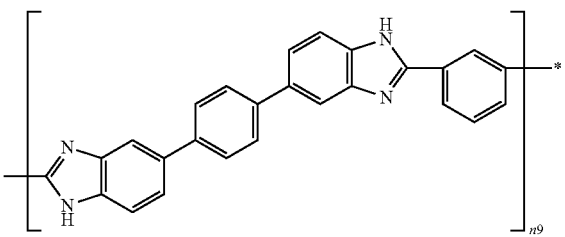

In Structural Formula 5 to Structural Formula 9, each of n5 to n9 independently represents the number of a repeating unit, and each repeating unit has a number average molecular weight (Mn) of 5,000-50,000.

The biaxially oriented film may be a film obtained by simultaneous biaxial orientation.

The simultaneous biaxial orientation may be carried out at a machine direction (MD) orientation ratio of 1.03-2 and a transverse direction (TD) orientation of 1.03-2.

The polymer electrolyte membrane for water electrolysis may have an average thickness of 30-100 μm.

The polymer electrolyte membrane for water electrolysis may be used for a water electrolysis device operated at a temperature of 40-95° C.

In another aspect, there is provided a method for manufacturing a polymer electrolyte membrane for alkaline water electrolysis, including biaxially orientating a polybenzimidazole-based polymer.

The biaxial orientation may be carried out by simultaneous biaxial orientation.

The simultaneous biaxial orientation may be carried out at a machine direction (MD) orientation ratio of 1.03-2 and a transverse direction (TD) orientation of 1.03-2.

The simultaneous biaxial orientation may be carried out at a relaxation ratio of 6-10%/s.

The simultaneous biaxial orientation may be carried out, while maintaining a temperature of 20-120° C.

After the simultaneous biaxial orientation, heat treatment may be further carried out at 180-220° C.

In still another aspect, there is provided a membrane-electrode assembly for alkaline water electrolysis, including the above-defined polymer electrolyte membrane for water electrolysis.

The membrane-electrode assembly may include a Raney nickel (Ni) electrode.

In yet another aspect, there is provided a water electrolysis device including the above-defined polymer electrolyte membrane for alkaline water electrolysis.

The polybenzimidazole-based electrolyte membrane for alkaline water electrolysis according to the present disclosure can reduce the concentration of an alkaline solution by improving the crystallinity of a polybenzimidazole-based polymer to increase the resistance against base, significantly improving the long-term stability of alkaline water electrolysis using a polybenzimidazole-based electrolyte membrane through the improved resistance against base, and by increasing the operation temperature to enhance the catalyst activity.

DETAILED DESCRIPTION

Figure 1:
FIG. 1 is a photographic image of the p-PBI electrolyte membrane obtained according to Example 1.

Hereinafter, various aspects and embodiments of the present disclosure will be explained in more detail. Exemplary embodiments now will be described more fully hereinafter with reference to the accompanying drawings, in which exemplary embodiments are shown.

The present disclosure may, however, be embodied in many different forms and should not be construed as limited to the exemplary embodiments set forth therein. In the description, details of well-known features and techniques may be omitted to avoid unnecessarily obscuring the presented embodiments.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. Furthermore, the use of the terms a, an, etc. does not denote a limitation of quantity, but rather denotes the presence of at least one of the referenced item. It will be further understood that the terms "comprises" and/or "comprising", or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

The term 'substituted' refers to substitution of at least one hydrogen atom with a substituent selected from the group consisting of deuterium, C1-C30 alkyl groups, C3-C30 cyclolalkyl groups, C2-C30 heterocycloalkyl groups, C1-C30 halogenated alkyl groups, C6-C30 aryl groups, C1-C3 heteroaryl groups, C1-C30 alkoxy groups, C2-C30 alkenyl groups, C2-C30 alkynyl groups, C6-C30 aryloxy groups, silyloxy group (—OSiH$_3$), —OSiR$^1$H$_2$ (wherein R$^1$ represents a C1-C30 alkyl group or a C6-C30 aryl group), —OSiR$^1$R$^2$H (wherein each of R$^1$ and R$^2$ independently represents a C1-C30 alkyl group or a C6-C30 aryl group), —OSiR$^1$R$^2$R$^3$ (wherein each of R$^1$, R$^2$ and R$^3$ independently represents a C1-C30 alkyl group or a C6-C30 aryl group), C1-C30 acyl groups, C2-C30 acyloxy groups, C2-C30 heteroaryloxy groups, C1-C30 sulfonyl groups, C1-C30 alkylthiol groups, C6-C30 arylthiol groups, C1-C30 heterocyclothiol groups, C1-C30 amide phosphate groups, silyl groups (SiR$^1$R$^2$R$^3$) (wherein each of R$^1$, R$^2$ and R$^3$ independently represents H, a C1-C30 alkyl group or a C6-C30 aryl group), amine groups (—NRR') (wherein each of R and R' independently represents a substituent selected from the group consisting of H, C1-C30 alkyl groups and C6-C30 aryl groups), carboxyl group, halogen groups, cyano group, nitro group, azo group, and hydroxyl group.

In addition, in the expression 'substituted or non-substituted C1-C30 alkyl groups', the range of number of carbon atoms in each alkyl group refers to the total number of carbon atoms forming the alkyl moiety regarded as non-substituted, not considering the moiety substituted with a substituent.

Hereinafter, the polymer electrolyte membrane for alkaline water electrolysis according to the present disclosure will be explain in more detail.

The polymer electrolyte membrane for alkaline water electrolysis according to the present disclosure includes a polybenzimidazole-based polymer, wherein the polybenzimidazole-based polymer is a biaxially oriented film.

Particularly, the polybenzimidazole-based polymer may be represented by any one of the following Structural Formula 1 to Structural Formula 4:

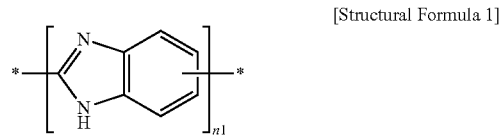

[Structural Formula 1]

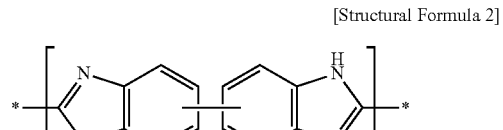

[Structural Formula 2]

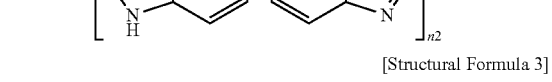

[Structural Formula 3]

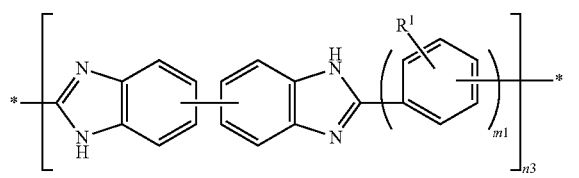

[Structural Formula 4]

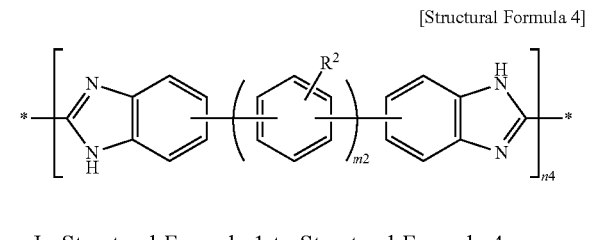

In Structural Formula 1 to Structural Formula 4,
each of R$^1$ and R$^2$ independently represents H, —SO$_3$H, or a substituted or non-substituted C1-C30 alkyl group,
each of m1 and m2 independently represents the number of a repeating unit which is an integer of 1-3, and
each of n1 to n4 independently represents the number of a repeating unit, and each repeating unit has a number average molecular weight (Mn) of 5,000-50,000.

Preferably, the polybenzimidazole-based polymer may be represented by any one selected from the following Structural Formula 5 to Structural Formula 9:

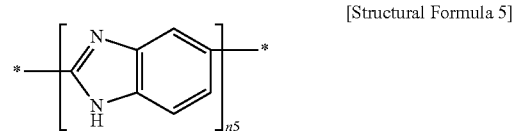

[Structural Formula 5]

[Structural Formula 6]

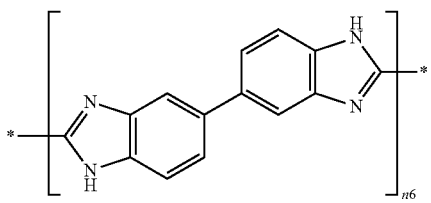

[Structural Formula 7]

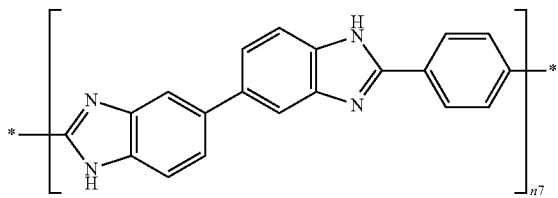

[Structural Formula 8]

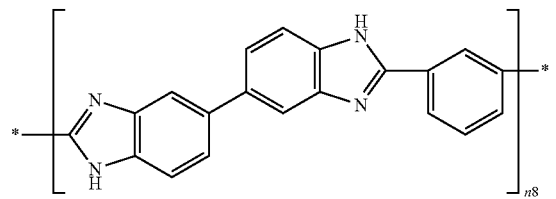

[Structural Formula 9]

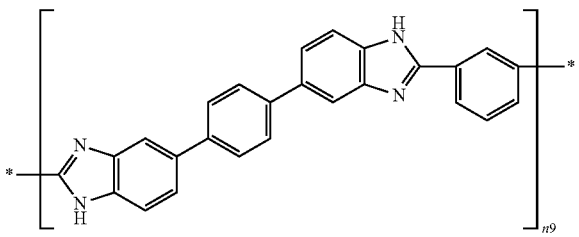

In Structural Formula 5 to Structural Formula 9, each of n5 to n9 independently represents the number of a repeating unit, and each repeating unit has a number average molecular weight (Mn) of 5,000-50,000.

More preferably, the polybenzimidazole-based polymer may be represented by Structural Formula 7.

The biaxially oriented film may be a film obtained by simultaneous biaxial orientation.

The simultaneous biaxial orientation may be carried out at a machine direction (MD) orientation ratio of 1.03-2 and a transverse direction (TD) orientation of 1.03-2.

The polymer electrolyte membrane for water electrolysis according to the present disclosure may have an average thickness of 30-100 μm. When the polymer electrolyte membrane for water electrolysis has a thickness of less than 30 μm, the problem of an increase in gas permeability may occur during the operation of water electrolysis. When the polymer electrolyte membrane for water electrolysis has a thickness of larger than 100 μm, it shows increased resistance to cause degradation of water electrolysis quality.

The polymer electrolyte membrane for water electrolysis according to the present disclosure is used for a water electrolyte device operated preferably at a temperature of 40-95° C., more preferably 50-85° C., and even more preferably 60-80° C.

Hereinafter, the method for manufacturing a polymer electrolyte membrane for alkaline water electrolysis according to the present disclosure will be explained.

The method for manufacturing a polymer electrolyte membrane for alkaline water electrolysis according to the present disclosure includes biaxially orienting a polybenzimidazole-based polymer.

The polybenzimidazole-based polymer is the same as described above, and reference will be made to the above description.

The biaxial orientation is carried out preferably by simultaneous biaxial orientation.

The simultaneous biaxial orientation may be carried out at a machine direction (MD) orientation ratio of 1.03-2 and a transverse direction (TD) orientation of 1.03-2.

The simultaneous biaxial orientation may be carried out preferably at a relaxation ratio of 6-10%/s, more preferably 7-9%/s, and even more preferably 7.5-8.5%/s.

The simultaneous biaxial orientation may be carried out, while maintaining a temperature preferably of 20-120° C., more preferably 30-80° C., and even more preferably 40-60° C.

After the simultaneous biaxial orientation, heat treatment may be further carried out preferably at 180-220° C., more preferably 190-210° C., and even more preferably 195-205° C.

In still another aspect, there is provided a membrane-electrode assembly for alkaline water electrolysis, including the above-defined polymer electrolyte membrane for water electrolysis.

The membrane-electrode assembly may include a Raney nickel (Ni) electrode, preferably. When applying such a Raney nickel electrode to the polymer electrolyte membrane for water electrolysis according to the present disclosure, it is possible to realize high electrochemical activity and long-term stability without using any conventional noble metal electrode, such as an electrode including $IrO_2$ or Pt/C.

In yet another aspect, there is provided a water electrolysis device including the above-defined polymer electrolyte membrane for alkaline water electrolysis.

Particularly, although it is not described clearly in the following examples, in the method for manufacturing a polymer electrolyte membrane for alkaline water electrolysis, including biaxially orienting a polybenzimidazole-based polymer, according to the present disclosure, a membrane-electrode assembly obtained by using the polymer electrolyte membrane obtained thereby and water electrolysis using the same, the long-term stability and electrochemical efficiency were determined, while varying the type of a polybenzimidazole-based polymer, machine direction (MD) orientation ratio, transverse direction (TD) orientation ratio, relaxation ratio, temperature during the simultaneous biaxial orientation, use of heat treatment after the simultaneous biaxial orientation and heat treatment temperature, type of an electrode used for the membrane-electrode assembly and the condition related with water electrolysis device operation temperature. As a result, when the following conditions are totally satisfied, it was possible to obtain the highest long-term stability and electrochemical efficiency.

The polybenzimidazole-based polymer is poly(2,2-p-phenylene-5,5-bibenzimidazole) (p-PBI), the simultaneous biaxial orientation is carried out at a machine direction (MD) orientation ratio of 1.03-2 and at a transverse direction (TD) orientation ratio of 1.03-2, the simultaneous biaxial orientation is carried out at a relaxation ratio of 7.5-8.5%/s, the simultaneous biaxial orientation is carried out, while maintaining a temperature of 40-60° C., heat treatment is further carried out at 195-205° C. after the simultaneous biaxial orientation, the electrode used for the membrane-electrode assembly is a Raney nickel (Ni) electrode, and the water electrolysis device is operated at a temperature of 60-80° C.

Hereinafter, the present disclosure will be explained in more detail with reference to Examples and Test Examples, but the scope of the present disclosure is not limited thereto.

EXAMPLES

Example 1: Manufacture of p-PBI Electrolyte Membrane

First, 3,3-diaminobenzidine (3.0 g, 0.014 mol) and terephthalic acid (2.6 g, 0.014 mol) were mixed with polyphosphoric acid (15 g) under argon atmosphere, and the reaction mixture was agitated at 150° C. for 5 hours and at 220° C. for 20 hours to prepare a polymer solution. Next, the polymer solution was poured to a glass plate and levelled with a doctor blade (blade having a height of 400 μm) to obtain a membrane having a uniform thickness. The glass plate coated with the membrane was introduced to a water bath to carry out quenching so that the membrane might be separated from the glass plate after about 30 seconds. Finally, the membrane was dipped in isopropanol to obtain a poly(2,2-p-phenylene-5,5-bibenzimidazole) (p-PBI) membrane. For reference, the polymerization of p-PBI is represented in the following Reaction Scheme 1.

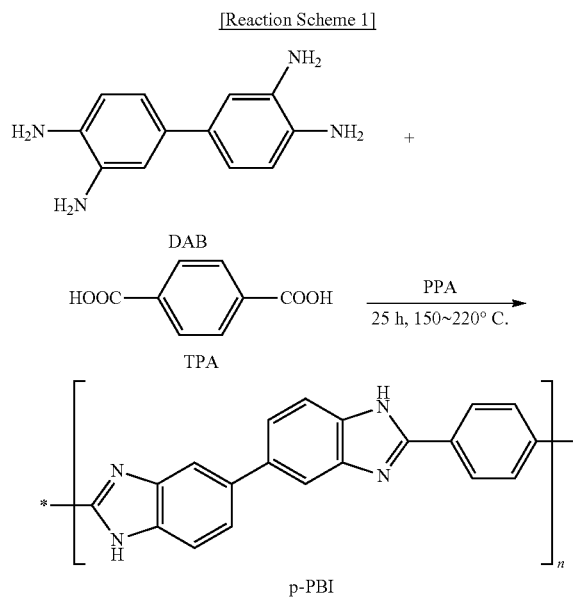

[Reaction Scheme 1]

The p-PBI membrane dipped in isopropanol was taken out therefrom, subjected to simultaneous biaxial orientation, and then dried at room temperature under ambient pressure to obtain a poly(2,2-p-phenylene-5,5-bibenzimidazole) (p-PBI) membrane having an average thickness of 60 μm.

Herein, the simultaneous biaxial orientation was carried out at a machine direction (MD) orientation ratio of 1.1 and a transverse direction (TD) orientation ratio of 1.1 with a relaxation ratio of 8%/s at an orientation zone temperature of 50° C., and then heat treatment was carried out at 200° C. after the orientation. The photographic image of the p-PBI membrane obtained according to Example 1 is shown in FIG. 1.

Example 2: m-PBI Electrolyte Membrane

An m-PBI electrolyte membrane was obtained in the same manner as Example 1, except that isophthalic acid was used instead of terephthalic acid. For reference, the polymerization of m-PBI is represented in the following Reaction Scheme 2.

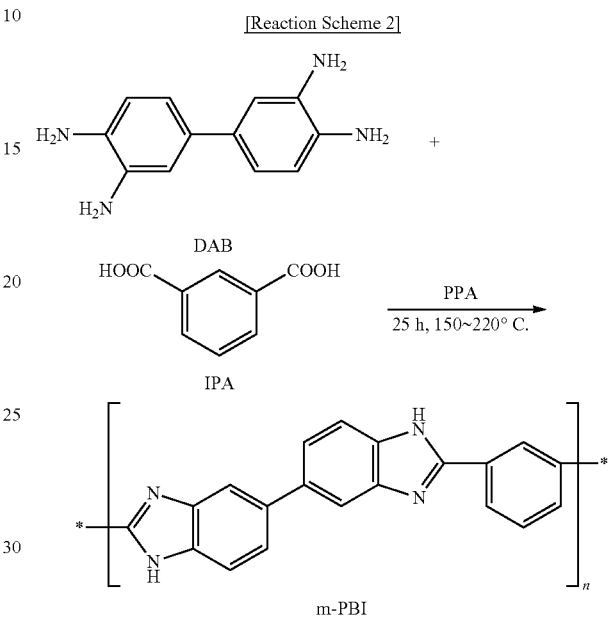

[Reaction Scheme 2]

Example 3: Manufacture of Membrane-Electrode Assembly (MEA) for Water Electrolysis (1) Preparation of Raney Ni Electrode Pretreatment To remove organic and inorganic impurities present on the surface of a Ni foam support, degassing and pickling were carried out. The surface impurities were removed by treating organic impurities with 30 wt % NaOH for 3 minutes at 90° C. and treating inorganic impurities with 20 wt % HCl for 1 minute at room temperature. Next, activation was carried out to remove passivation materials, such as $NiO_2$. The activation was carried out by dipping the Ni foam in 70 wt % $H_2SO_4$ solution for 3 minutes at room temperature to oxidize the Ni foam at 100 mA $cm^{-2}$. Then, the Ni foam was introduced to the Wood's bath ($NiCl_2$ (240 g $L^{-1}$), HCl (120 mL $L^{-1}$)) to facilitate electrodeposition of electroplating during a strike process, and reduction was carried out at room temperature for 5 minutes to perform nickel plating. The activation and strike processes were carried out by using a power supply in a two-electrode system including a working electrode and a counter electrode.

Electroplating

The pretreated Ni foam support was introduced to a plating solution based on the Watt's bath to carry out plating under the conditions of 60° C. and 200 mA $cm^{-2}$ for 40 minutes. The plating solution was prepared by using $H_3BO_3$ (37.5 g $L^{-1}$), $C_6H_5K_3O_7$ (32.44 g $L^{-1}$), $FeSO_4 \cdot 7H_2O$ (30 g $L^{-1}$), $NiSO_4 \cdot 6H_2O$ (330 g $L^{-1}$), $NiCl_2 \cdot 6H_2O$ (45 g $L^{-1}$), $ZnCl_2$ (20 g $L^{-1}$) and $C7H_5NO_3S$ (1 g $L^{-1}$). In the same manner as the activation and strike processes, electroplating was carried out by using a power supply in a two-electrode system including a working electrode and a counter electrode.

Post-Treatment

When zinc is dealloyed from an electroplated electrode, voids are formed on the plated surface of the electrode to cause an increase in specific surface area, resulting in improvement of electrochemical activity. The electrode obtained as described above was subjected to reaction in an alkaline solution (30 wt % KOH, 10 wt % $KNaC_4H_4O_6.4H_2O$) at 80° C. for 24 hours for the purpose of zinc (Zn) dealloying. Since nickel present on the electrode dipped in the alkaline solution forms nickel hydride ($NiH_2$), it may cause natural ignition in the air. Therefore, the electrode was stored in 15 wt % $H_2O_2$ so that the electrode surface might be substituted with nickel hydroxide ($Ni(OH)_2$). The treatment with $H_2O_2$ was carried out until no air bubbles were generated from the electrode.

(2) Manufacture of Membrane-Electrode Assembly

A polytetrafluoroethylene (PTFE) gasket having a thickness of 1 cm was cut into the same size (6×6 $cm^2$) as the bipolar plate of a unit cell, and the central portion having an area of 2.5×2.5 $cm^2$ was cut out in order to locate an electrode therein. In addition, a membrane protective gasket made of Teflon was cut into the same size (6×6 $cm^2$) as the PTFE gasket, and a portion having an area of 2.3×2.3 $cm^2$ was cut out. The membrane obtained as described above was introduced to and treated with 1 M KOH for 3 hours, and then two Raney Ni electrodes obtained from part (1) were cut into a size of 2.5×2.5 $cm^2$ and introduced to the PTFE gasket having a thickness of 1 cm. Then, pressing was carried out under 1 ton for 1 minute. Then, cell binding was carried out in the order of an end plate-bipolar plate-PTFE gasket-Raney Ni electrode-membrane protective gasket-p-PBI electrolyte membrane according to Example 1. In addition, the structure of a membrane protective gasket-Raney Ni electrode-PTFE gasket-bipolar plate-end plate was stacked and bound thereto to form symmetry based on the p-PBI electrolyte membrane according to Example 1. The binding was carried out, while increasing the binding pressure from 1.3 to 3.5 N $m^{-1}$ at a rate of 0.2 N $m^{-1}$.

Comparative Example 1: Manufacture of Membrane-Electrode Assembly (MEA) for Water Electrolysis (1) Manufacture of $IrO_2$, Pt/C Electrodes $IrO_2$ Anode First, $IrO_2$ catalyst was prepared by the method of coated catalyst substrate (CCS) including loading a catalyst directly on a gas diffusion layer (GDL). Particularly, 0.5 g of distilled water and 0.0087 g of PTFE as an ionomer were added to 0.05 g of $IrO_2$. The catalyst was allowed to be wetted homogeneously, and 5 g of isopropyl alcohol (IPA) was added. The ratio of catalyst:ionomer was 0.9:0.1. The prepared catalyst slurry was dispersed through ultrasonication for 40 minutes, wherein the temperature was controlled not to exceed 40° C. The gas diffusion layer was titanium felt, and the catalyst was sprayed homogeneously over an area of 2.5×2.5 $cm^2$ in an amount of 2.0 mg $cm^{-2}$. Then, heat treatment was carried out at 350° C. for 10 minutes to disperse PTFE homogeneously.

Pt/C Cathode

Similarly to the $IrO_2$ catalyst, a Pt/C catalyst was prepared by the method of CCS, and catalyst slurry was prepared by using the same catalyst amount, the same amount of distilled water, ionomer and isopropyl alcohol and the same catalyst/ionomer ratio. The prepared catalyst slurry was dispersed through ultrasonication for 40 minutes, while the temperature was controlled carefully not to exceed 40° C. The gas diffusion layer was carbon paper (TGP-H-120), and the catalyst was sprayed homogeneously over an area of 2.5×2.5 $cm^2$ in an amount of 1.0 mg $cm^{-2}$. Then, heat treatment was carried out at 350° C. for 10 minutes to disperse PTFE homogeneously.

(2) Manufacture of Membrane-Electrode Assembly

An end plate-carbon separator-Pt/C cathode-p-PBI electrolyte membrane according to Example 1-$IrO_2$ anode-gold-plated titanium separator-end plate were stacked successively, and the resultant structure was bound under a binding pressure of 4 Nm to form an assembly.

Test Examples

Test Method

Each of the membrane-electrode assemblies according to Example 3 and Comparative Example 1 was connected to the feed line and vent line of a quality test station. Herein, the cathode was not connected with the feed line due to the dry cathode operation. First, 10 wt % KOH was supplied to the anode at a flow rate of 30 mL $min^{-1}$, discharge of KOH from the vent line was checked, and then the temperature of the whole feed line and that of the unit cell were increased by 20° C. and set to 85° C. and 80° C., respectively. To carry out the electrochemical quality test of the unit cell, the unit cell was connected to the potentiostat/galvanostat (Biologic, HCP-803).

The test was carried out in the order of linear sweep voltammetry (LSV) for determining initial quality, constant voltage mode for activating the unit cell, electrochemical impedance spectroscopy (EIS) for measuring the resistance of the membrane and electrodes, and linear sweep voltammetry (LSV) for determining the quality of the activated unit cell. The linear sweep voltammetry (LSV) was carried out at a scan rate of 10 mV $s^{-1}$ from 1.4 V to 2.0 V. In the constant voltage condition, a constant voltage of 1.55 V was applied. Then, electrochemical impedance spectroscopy (EIS) was carried out at 1.6 V under the condition of an amplitude of 16 mV from 50 kHz to 50 mHz. Right after the EIS, LSV was performed to determine the quality of the activated unit cell. After the EIS, the unit cell was operated under the same condition in a constant voltage mode to carry out evaluation of long-term stability.

Test Example 1: Electrochemical Impedance Spectroscopy (EIS) Analysis

Figure 2:
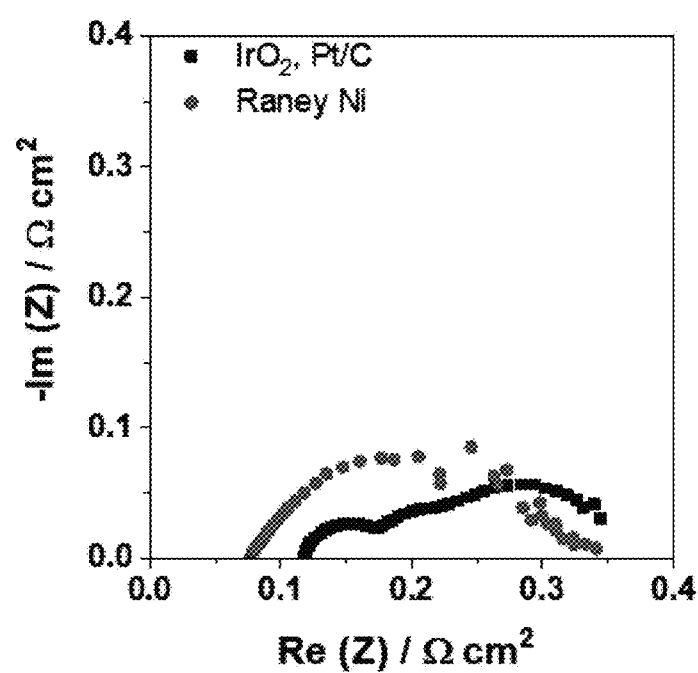
FIG. 2 illustrates the result of electrochemical impedance spectroscopy (EIS) analysis according to Test Example 1.

FIG. 2 illustrates the result of electrochemical impedance spectroscopy (EIS) analysis of the unit cell including each of the membrane-electrode assemblies according to Example 3 and Comparative Example 1. The EIS result is a measure with which the membrane and catalyst resistance can be determined.

It can be seen from the result that the membrane-electrode assembly obtained by using the Raney nickel (Ni) electrode according to Example 3 shows relatively lower membrane resistance and electrode resistance values, as compared to the noble metal (anode: $IrO_2$, cathode: Pt/C) membrane-electrode assembly tested under the same condition. While the membrane-electrode assembly obtained by using the p-PBI membrane and Raney Ni electrode according to Example 3 shows a transverse axis start point of 0.076, end point of 0.341 and a longitudinal axis of 0.08, the membrane-electrode assembly obtained by using the p-FBI membrane and noble metal catalyst according to Comparative Example 1 shows a transverse axis start point of 0.118, end point of 0.344 and a longitudinal axis of 0.06.

Test Example 2: Linear Sweep Voltammetry (LSV) Analysis

Figure 3:
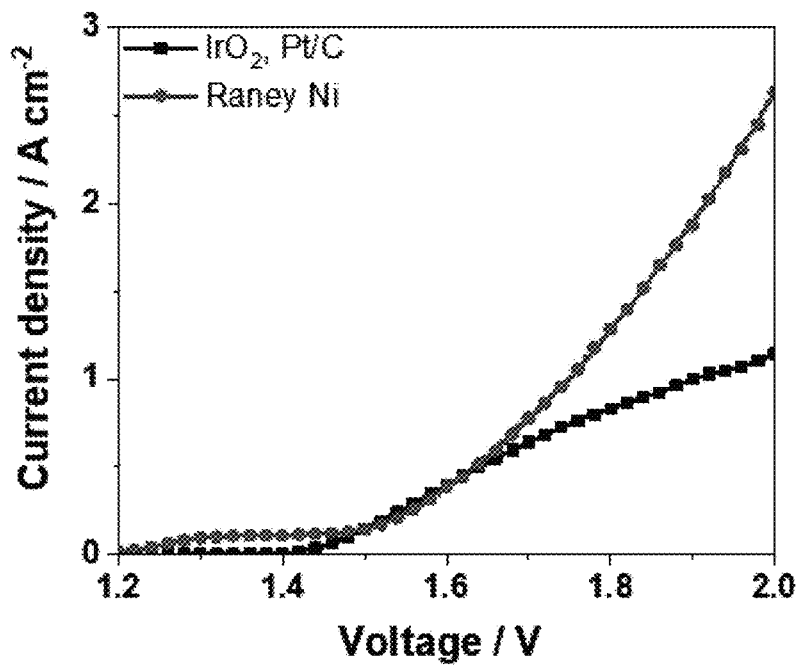
FIG. 3 illustrates the result of linear sweep voltammetry (LSV) analysis according to Test Example 2.

FIG. 3 illustrates the result of linear sweep voltammetry (LSV) of the unit cell including each of the membrane-electrode assemblies according to Example 3 and Comparative Example 1.

It can be seen from the result that the membrane-electrode assembly (2.65 A cm$^{-2}$ at 2 V) including the p-PBI membrane and Raney Ni electrode according to Example 3 provides quality at least about 2.3 times higher than the quality of the membrane-electrode assembly (1.14 A cm$^{-2}$ at 2 V) including the conventional noble metal catalyst according to Comparative Example 1. It is thought that such a result is derived from a relatively low membrane resistance. In addition, when applying a low voltage (1.2-1.4 V), the unit cell according to Example 3 shows higher activity as compared to the unit cell according to Comparative Example 1. It is thought that this is because Ni on the surface of the Raney Ni catalyst is converted into an active material (Ni(OH)$_2$) in an alkaline solution to cause a change in electric current.

Test Example 3: Evaluation of Long-Term Stability

Figure 4:
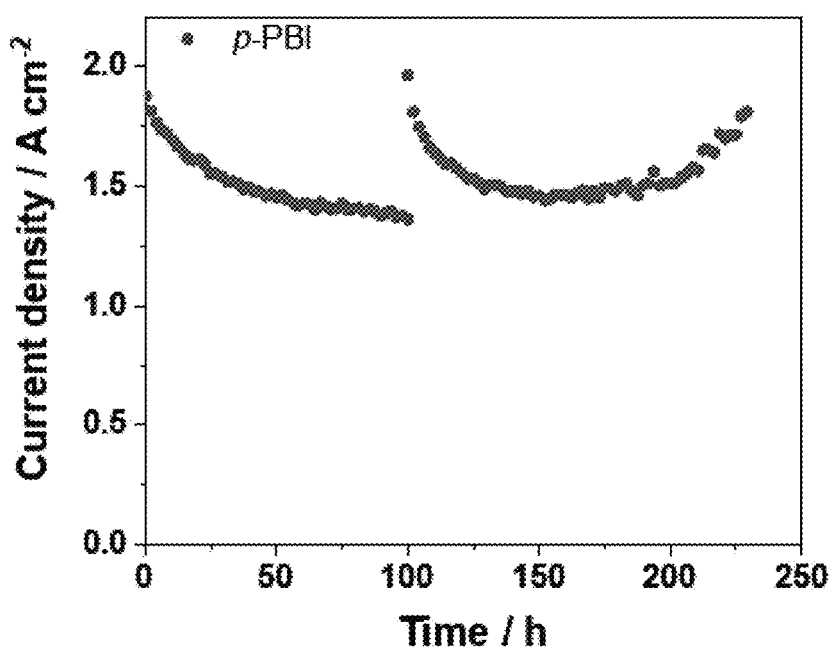
FIG. 4 to FIG. 6 illustrate the result of evaluation of long-term stability according to Test Example 3.

FIG. 4 illustrates the result of evaluation of long-term stability of the unit cell including the membrane-electrode assembly according to Example 3. In the same manner as the analysis of the unit cell quality, the test was carried out under a constant voltage condition by applying a voltage of 2 V. In the test, long-term quality was evaluated for about 230 hours. After the test, the unit cell shows a stable result for 200 hours.

Figure 5:
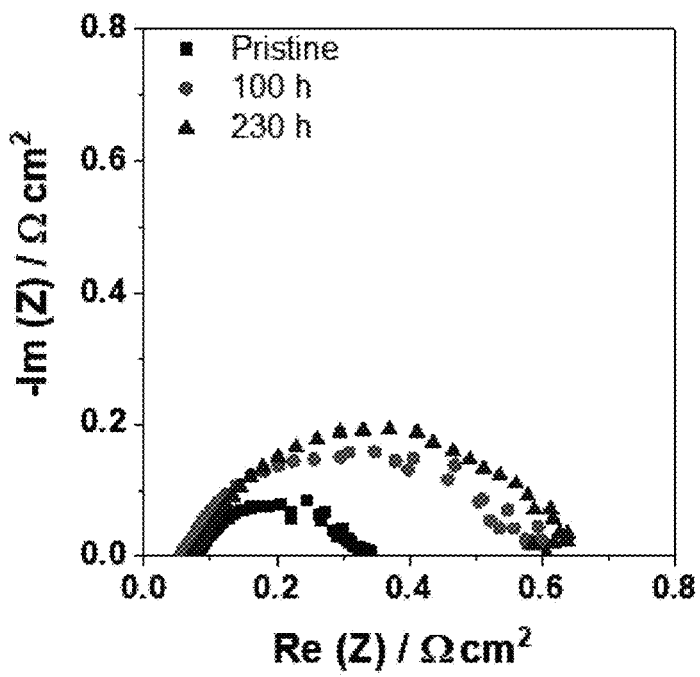

In addition, FIG. 5 illustrates the EIS analysis result of the unit cell including the membrane-electrode assembly according to Example 3, wherein the analysis is carried out at a time point 100 hours after the long-term quality test (a transverse axis start point of 0.072, end point of 0.618 and a longitudinal axis of 0.192). It can be seen from the result that the electrode resistance is increased with time in the long-term quality test, but the membrane resistance is similar to the initial resistance or is reduced rather.

Figure 6:
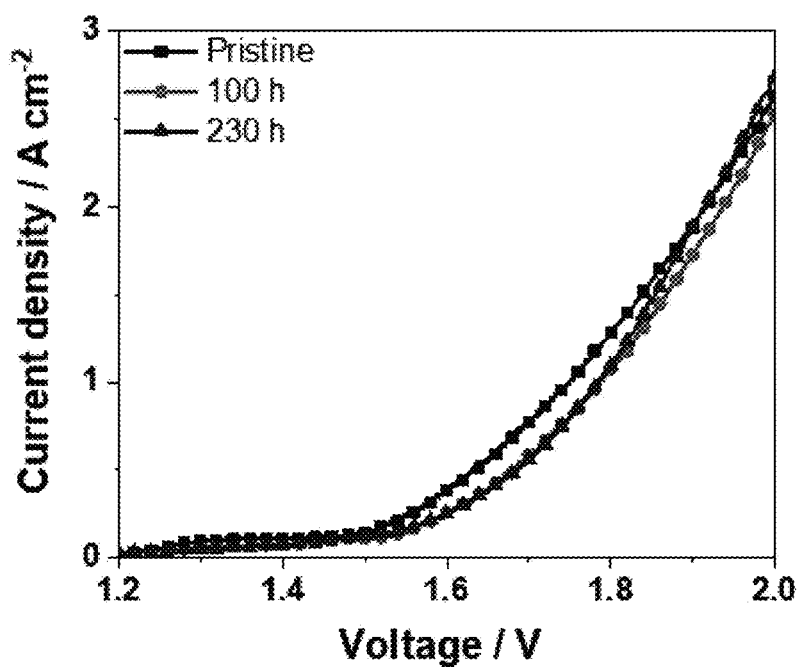

Meanwhile, FIG. 6 illustrates the quality test result of the unit cell including the membrane-electrode assembly according to Example 3, wherein the analysis is carried out at a time point 100 hours after the long-term quality test and the long-term quality test end point (i.e. 230 hours after the long-term quality test). It can be seen from the result that the unit cell including the membrane-electrode assembly according to Example 3 shows no change in its quality up to 230 hours.

While the present disclosure has been described with respect to the specific embodiments, it will be apparent to those skilled in the art that various changes and modifications may be made by addition, change or elimination of constitutional elements without departing from the spirit and scope of the disclosure as defined in the following claims, and such changes and modifications also fall within the scope of the present disclosure.

What is claimed is:

1. A polymer electrolyte membrane for alkaline water electrolysis which comprises a polybenzimidazole-based polymer, wherein the polybenzimidazole-based polymer is a biaxially oriented film; and
wherein the polybenzimidazole-based polymer is represented by any one of the following Structural Formula 2 to Structural Formula 4:

[Structural Formula 2]

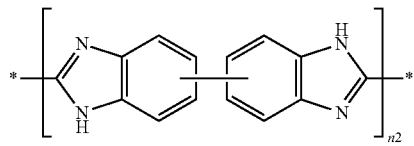

[Structural Formula 3]

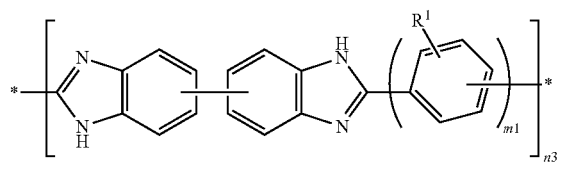

[Structural Formula 4]

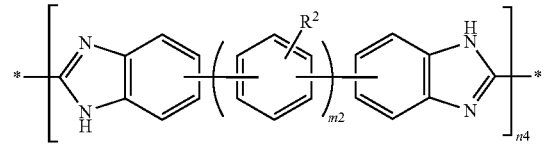

In Structural Formula 2 to Structural Formula 4,
each of R$^1$ and R$^2$ independently represents H, —SO$_3$H, or a substituted or non-substituted C1-C30 alkyl group;
each of m1 and m2 independently represents the number of a repeating unit which is an integer of 1-3; and
each of n1 to n4 independently represents the number of a repeating unit, and each repeating unit has a number average molecular weight (Mn) of 5,000-50,000.

2. The polymer electrolyte membrane for alkaline water electrolysis according to claim 1, wherein the polybenzimidazole-based polymer is represented by any one selected from the following Structural Formula 6 to Structural Formula 9:

[Structural Formula 6]

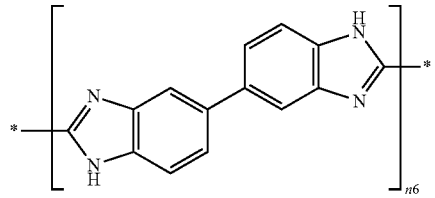

[Structural Formula 7]

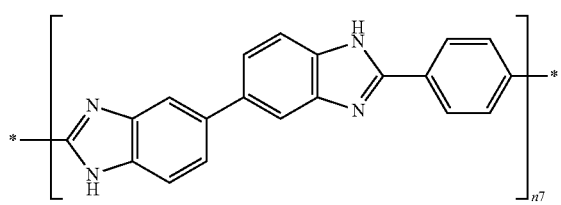

[Structural Formula 8]

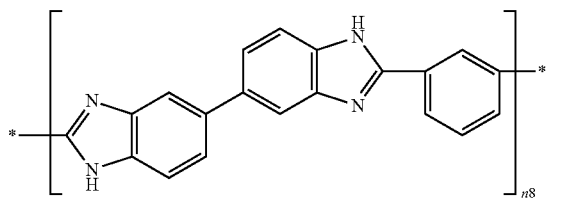

[Structural Formula 9]

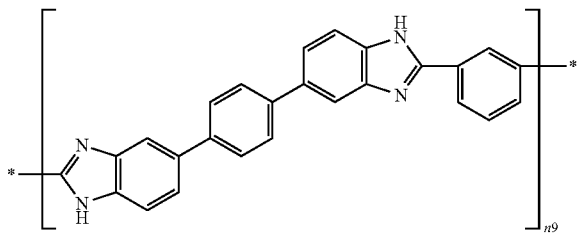

in Structural Formula 6 to Structural Formula 9, each of n6 to n9 independently represents the number of a repeating unit, and each repeating unit has a number average molecular weight (Mn) of 5,000-50,000.

3. The polymer electrolyte membrane for alkaline water electrolysis according to claim 1, wherein the biaxially oriented film is a film obtained by simultaneous biaxial orientation.

4. The polymer electrolyte membrane for alkaline water electrolysis according to claim 3, wherein the simultaneous biaxial orientation is carried out at a machine direction (MD) orientation ratio of 1.03-2 and a transverse direction (TD) orientation of 1.03-2.

5. The polymer electrolyte membrane for alkaline water electrolysis according to claim 1, which has an average thickness of 30-100 μm.

6. The polymer electrolyte membrane for alkaline water electrolysis according to claim 1, which is used for a water electrolysis device operated at a temperature of 40-95° C.

7. A membrane-electrode assembly for alkaline water electrolysis, comprising the polymer electrolyte membrane for water electrolysis as defined in claim 1.

8. The membrane-electrode assembly for alkaline water electrolysis according to claim 7, which comprises a Raney nickel (Ni) electrode.

9. A water electrolysis device comprising the polymer electrolyte membrane for alkaline water electrolysis as defined in claim 1.

* * * * *